United States Patent
Hornback et al.

(12) 
(10) Patent No.: US 6,445,479 B1
(45) Date of Patent: Sep. 3, 2002

(54) ELECTRONICALLY CONTROLLED OPTICALLY-ACTIVE DEVICE ARRAY FOR HIGH-SPEED RECEIVING AND TRANSMITTING OF FIBER OPTIC SIGNALS

(75) Inventors: Verne C. Hornback; Derryl D. J. Allman, both of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/216,396

(22) Filed: Dec. 18, 1998

(51) Int. Cl.[7] .......................... H04B 10/06; H04B 10/00
(52) U.S. Cl. ......................... 359/194; 359/158
(58) Field of Search ................... 359/158, 159, 359/180, 181, 189, 193, 194; 250/208.2, 222.1, 221

(56) References Cited

U.S. PATENT DOCUMENTS

| | | | |
|---|---|---|---|
| 4,631,519 A | * 12/1986 | Johnston | 340/347 |
| 4,718,063 A | * 1/1988 | Reedy et al. | 370/112 |
| 4,740,951 A | 4/1988 | Lizet et al. | 370/3 |
| 5,010,543 A | 4/1991 | Hill | 370/3 |
| 5,064,263 A | 11/1991 | Stein | 385/14 |
| 5,206,920 A | 4/1993 | Cremer et al. | 385/37 |
| 5,329,393 A | 7/1994 | Huang | 359/135 |
| 5,357,249 A | 10/1994 | Azaren et al. | 341/100 |
| 5,440,416 A | 8/1995 | Cohen et al. | 359/127 |
| 5,694,215 A | 12/1997 | Carver | 356/246 |
| 6,310,571 B1 | * 10/2001 | Yang et al. | 341/155 |

* cited by examiner

Primary Examiner—Leslie Pascal
Assistant Examiner—Dalzid Singh
(74) Attorney, Agent, or Firm—Trexler, Bushnell, Giangiori & Blackstone, LTD

(57) ABSTRACT

A receiver for detecting a stream of optical data bits which are transmitted at a predetermined frequency includes a plurality of optically-active devices arranged on an integrated circuit substrate in an array. The plurality of optically-active devices are capable of being positioned to receive the stream of optical data bits which are transmitted as light, and each of the optically active devices is capable of detecting light in an optically active state and generating a detected signal corresponding thereto. A control circuit receives a clock signal at a rate corresponding to the predetermined frequency and generates control signals which cause a different one of the plurality of optically-active devices to be in the optically active state during each successive period and thereby detect the presence of light during each of said successive periods and generate the detected signals corresponding to the data bit stream.

43 Claims, 10 Drawing Sheets

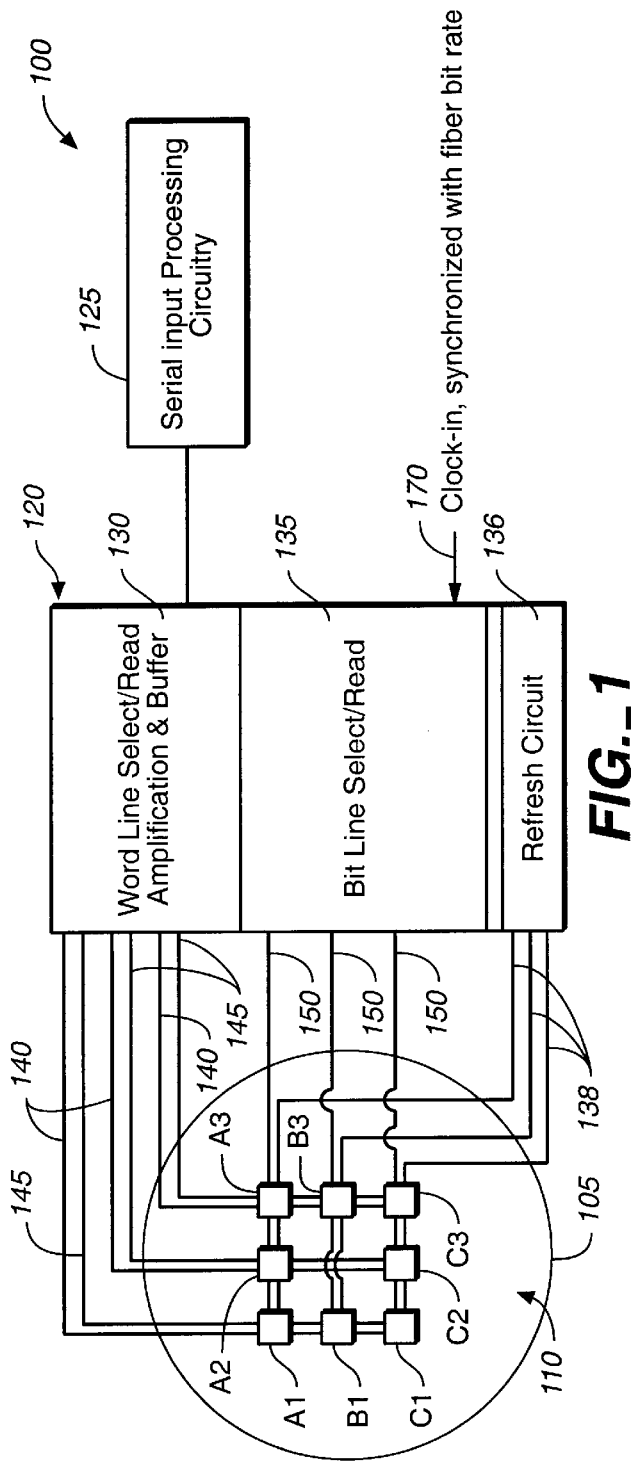
FIG._1
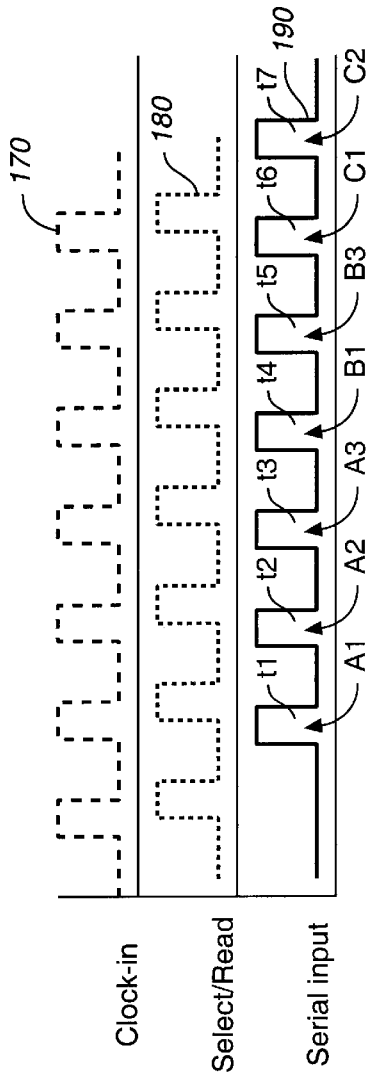
FIG._2

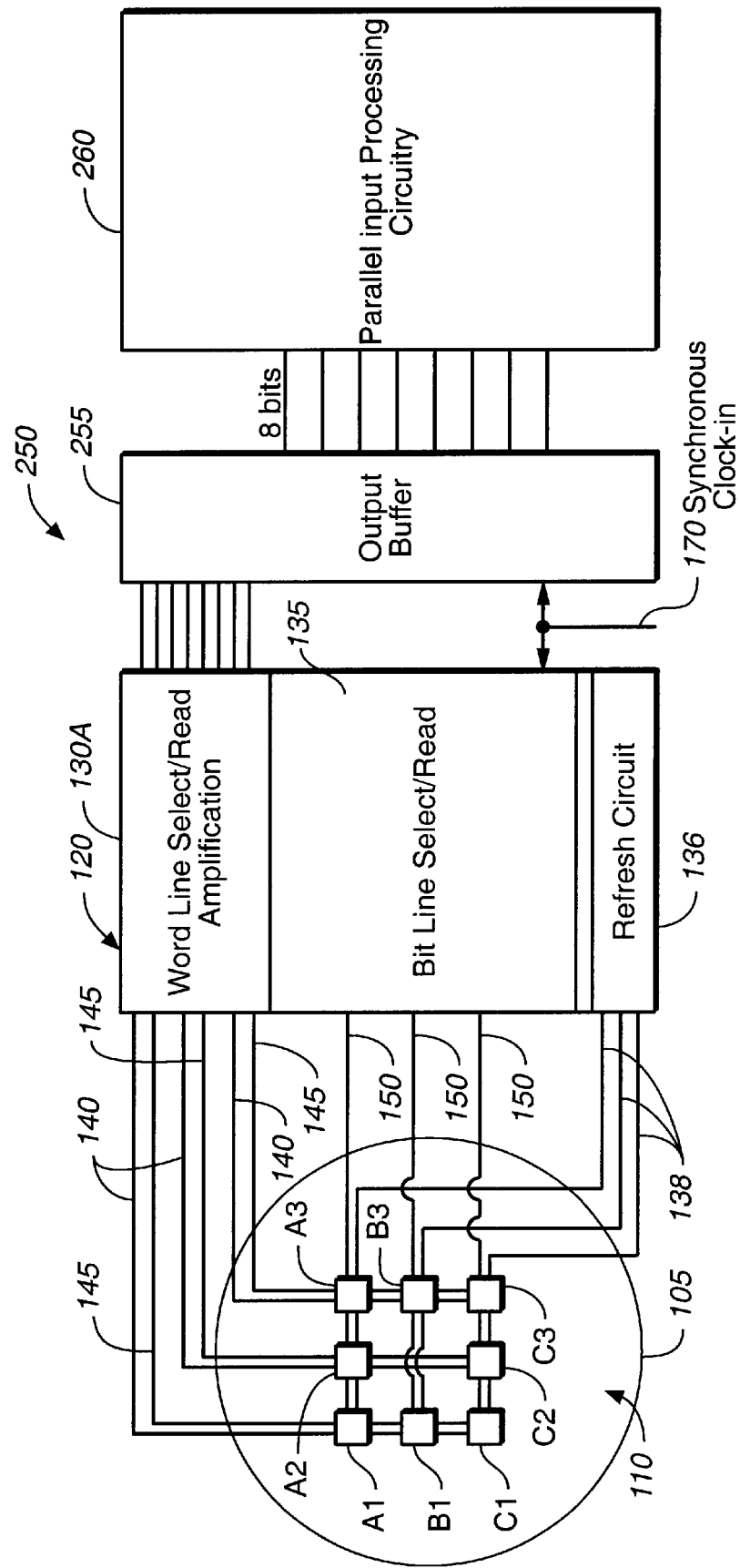
FIG._3

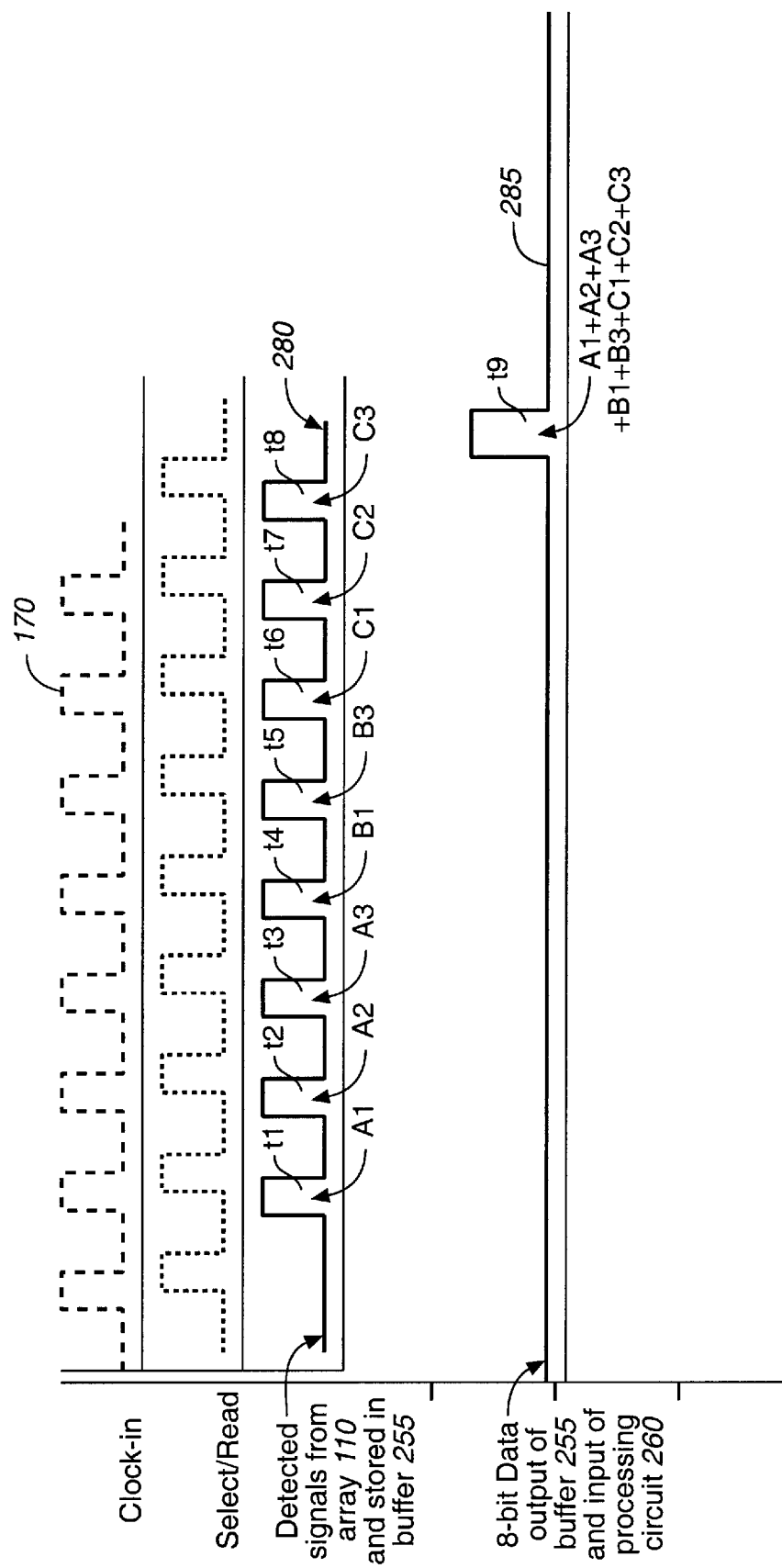
FIG._4

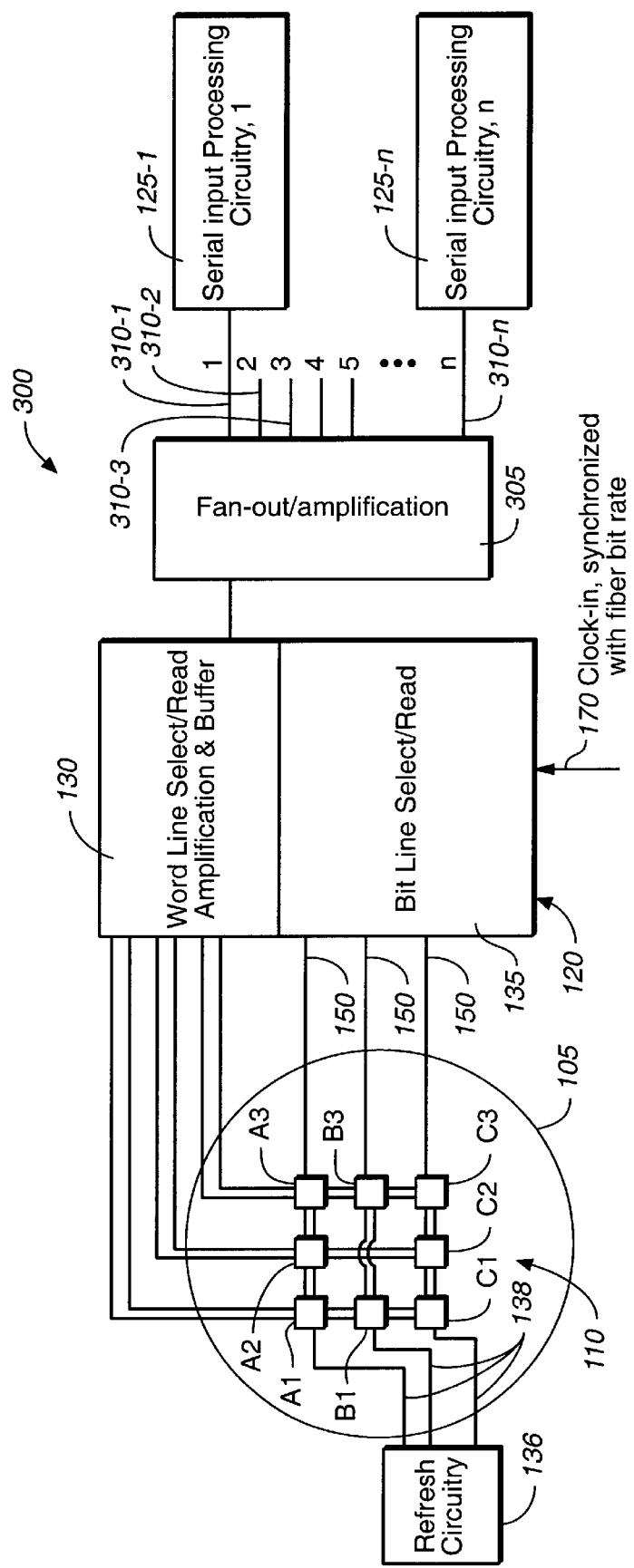
FIG._5

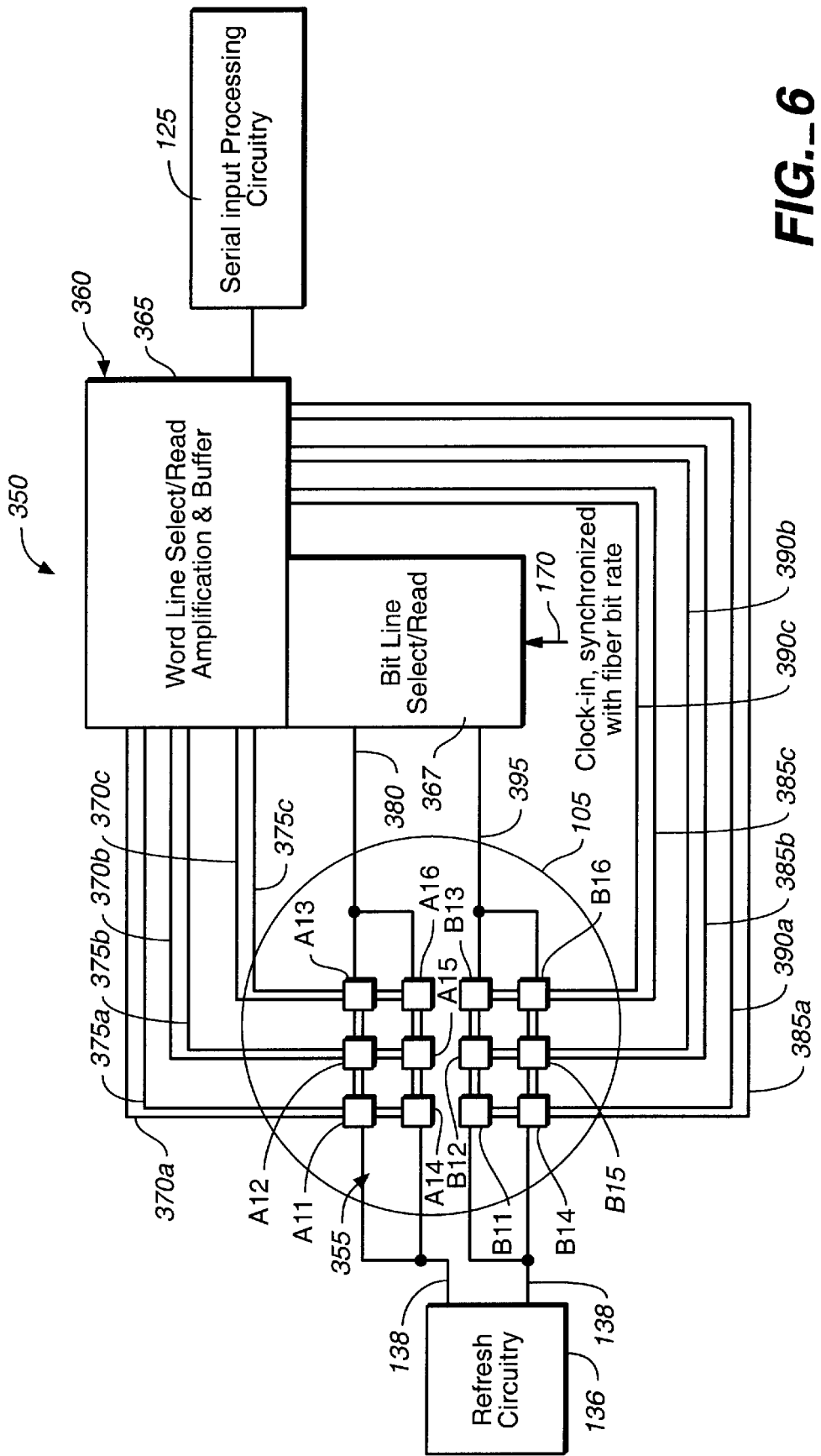
FIG._6

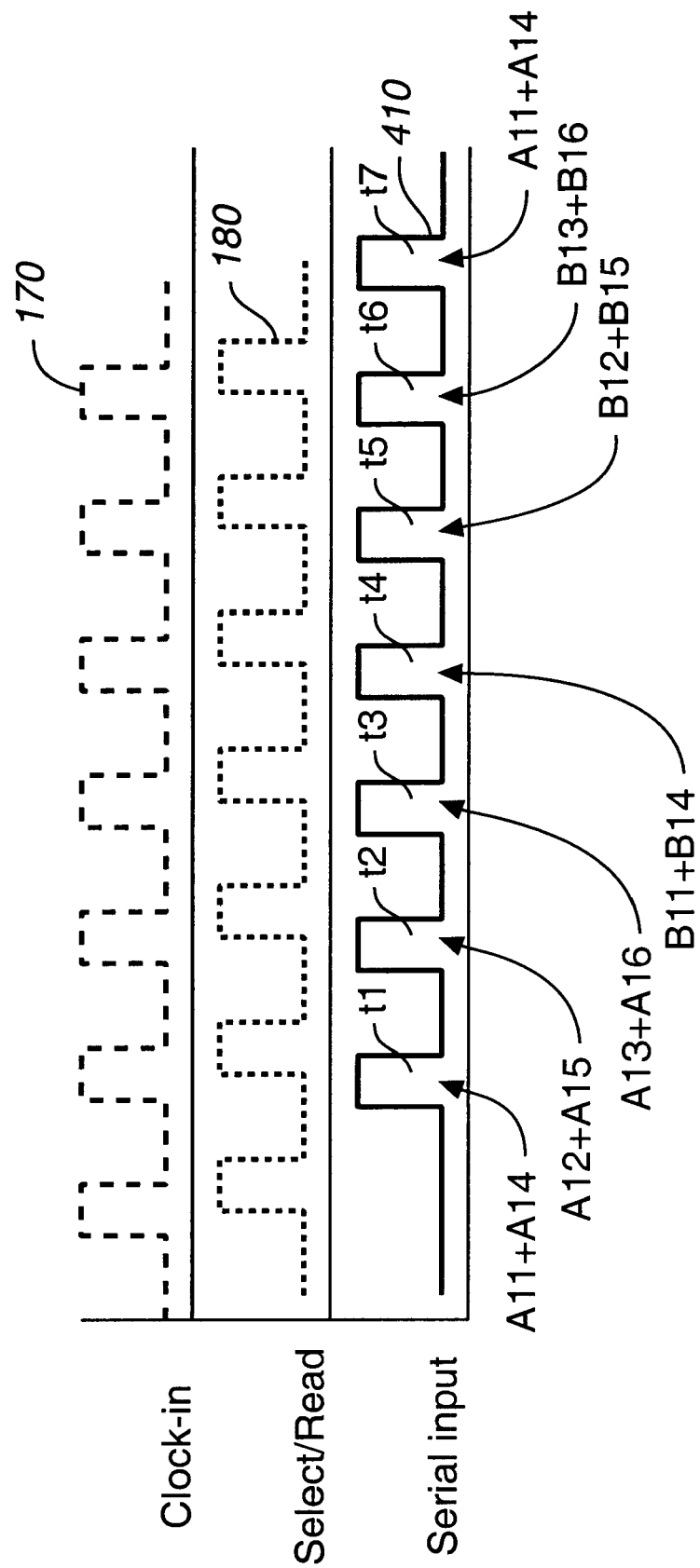
FIG._6A

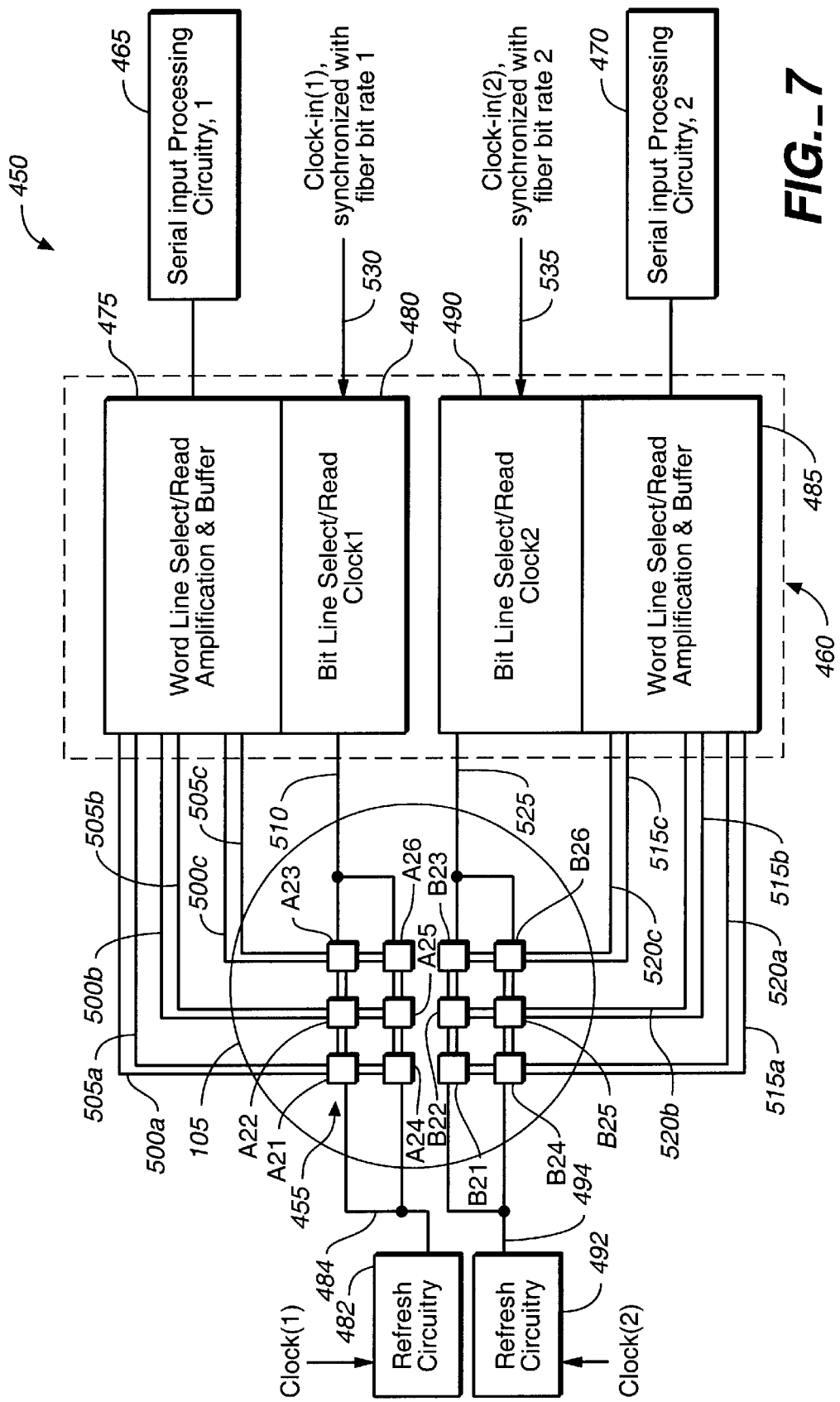
FIG._7

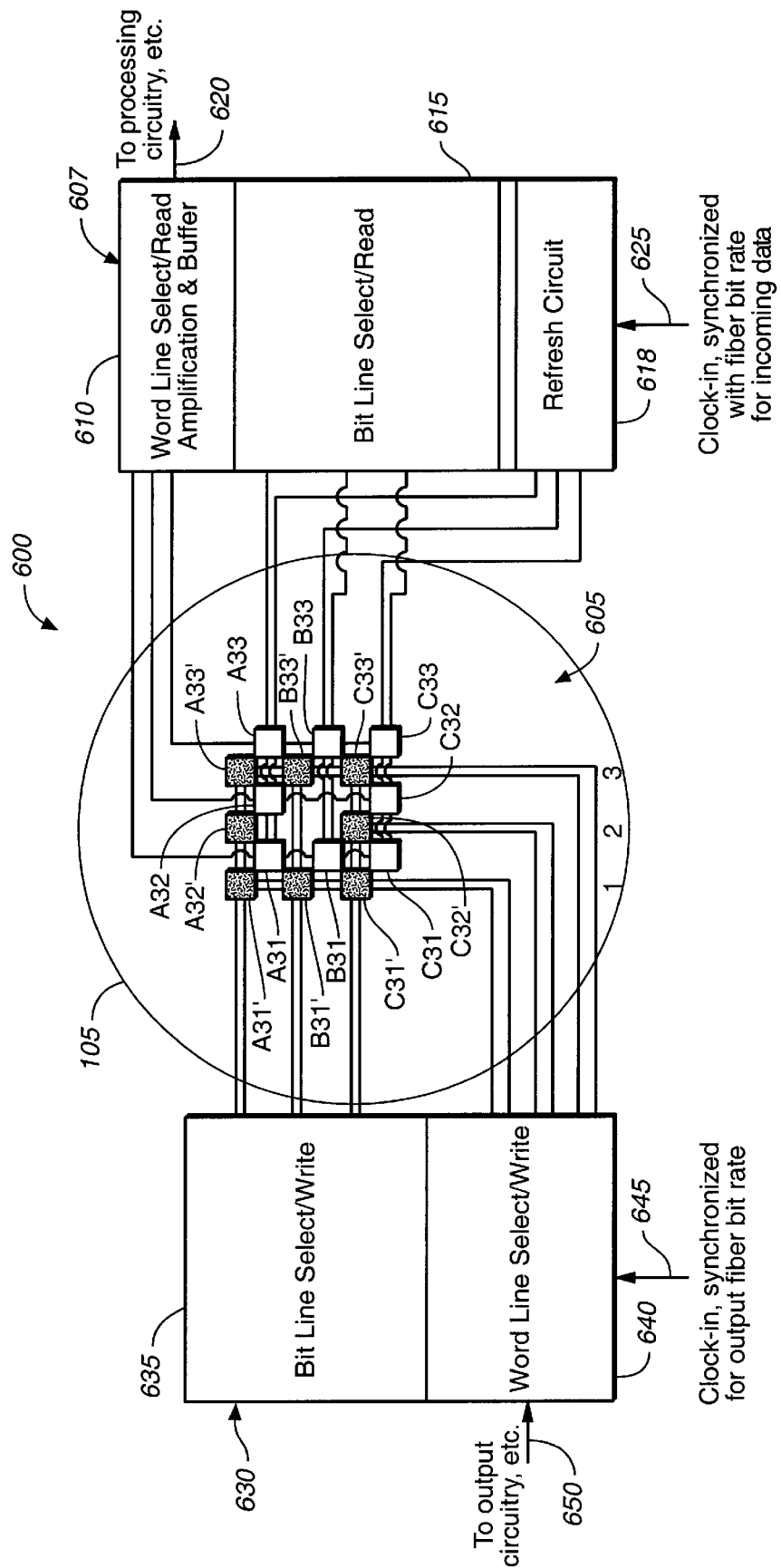
FIG._8

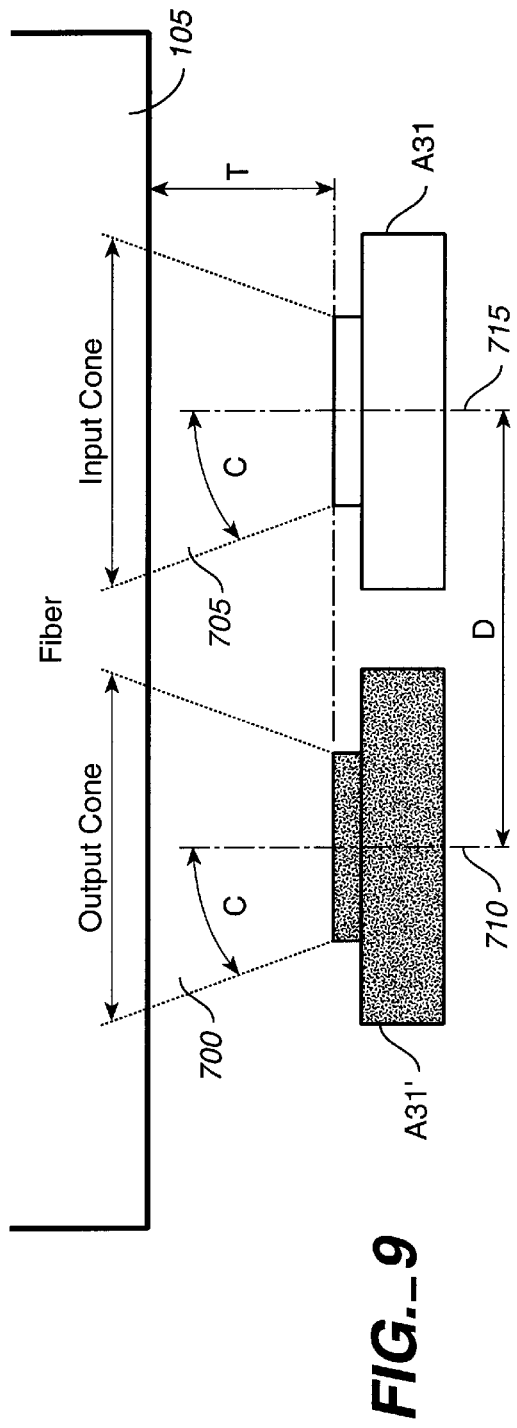
FIG._9
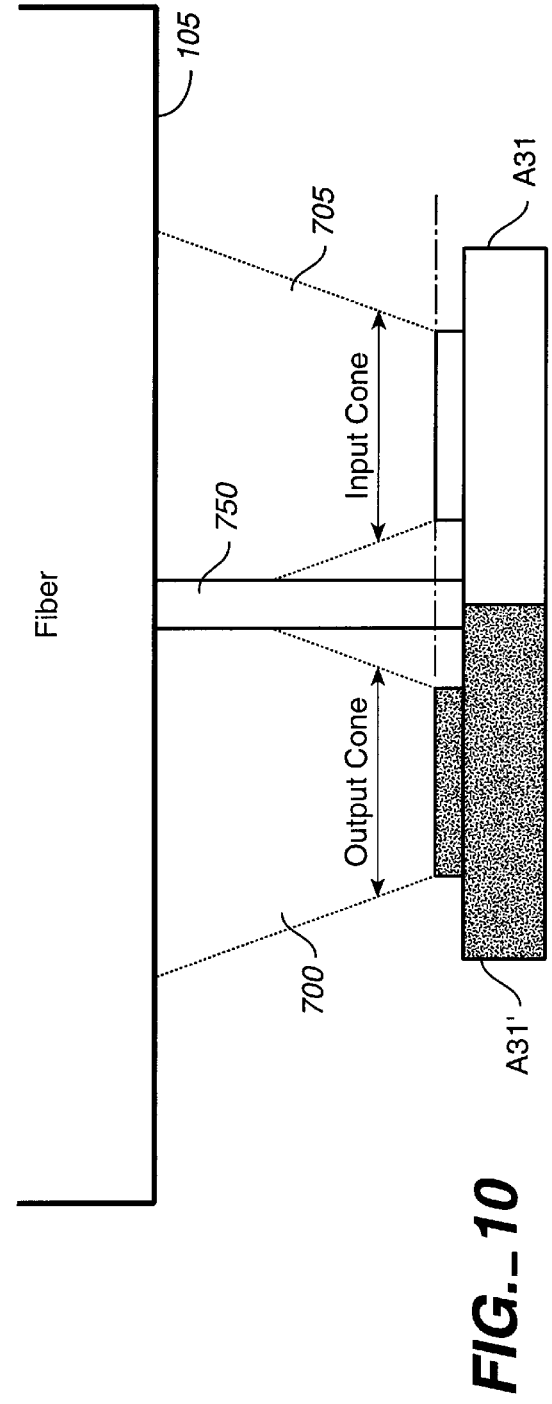
FIG._10

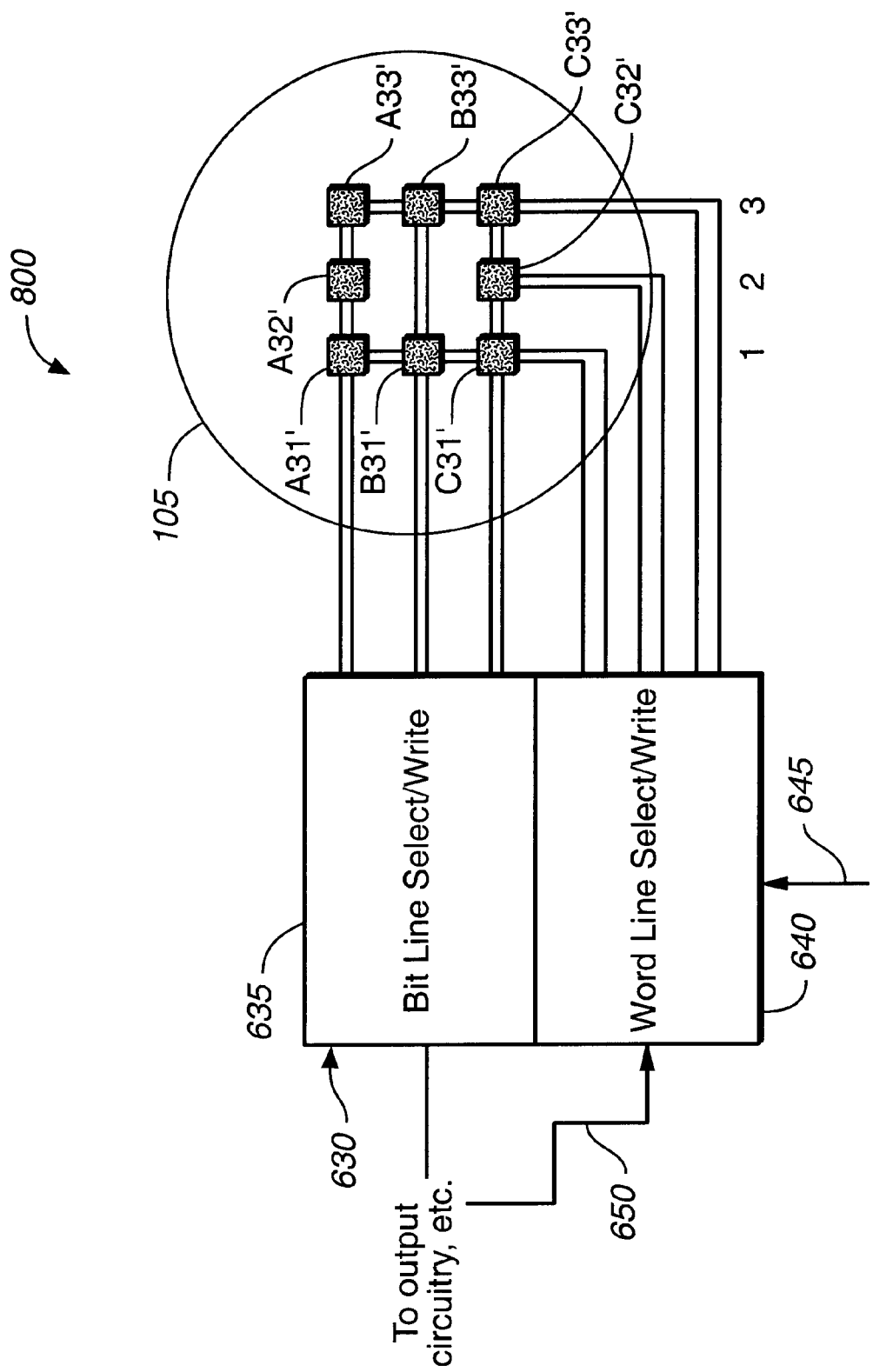
FIG._11

US 6,445,479 B1

ELECTRONICALLY CONTROLLED OPTICALLY-ACTIVE DEVICE ARRAY FOR HIGH-SPEED RECEIVING AND TRANSMITTING OF FIBER OPTIC SIGNALS

FIELD OF THE INVENTION

This invention relates generally to the field of data communications systems and more specifically to receivers and transmitters for processing optical data bits.

BACKGROUND OF THE INVENTION

When transmitting data between separate digital circuits or processing units, fiber optic conductors or links may be used to transmit the data. Use of fiber optic signals permits transmission of data at higher speeds and at reasonable costs. However, the high frequency of optical signals on fiber optic conductors exceeds the recovery rate of many optical receiver and transmitter systems, particularly systems using silicon devices. Thus, the slower conventional optical receivers are unable to optimally sample and recover the high speed optical transmission data.

Thus, there is a need for an effective receiver and transmitter system capable of processing high speed optical transmission data.

SUMMARY OF THE INVENTION

The present invention advantageously permits devices having slower recovery times, which are still fast enough to see the incoming signal, to be used for selectively sampling an incoming high frequency optical data bit stream.

The present invention also advantageously eliminates the sampling problems encountered by conventional optical receivers.

The present invention also advantageously provides a receiver which is capable of receiving optical data bits streams for a wide range of bandwidths by use of multiple clock signals.

The present invention also advantageously provides a receiver which can be used with various types of conventional processing circuits for reforming the received optical data bits into desired output patterns.

The present invention advantageously provides a transmitter capable of transmitting a high frequency optical data bit stream.

The present invention also advantageously provides a system which prevents interference between an outgoing optical data bit stream and an incoming optical data bit stream.

The present invention provides the above advantages, as well as others, through a receiver for detecting a stream of optical data bits which are transmitted as light at a predetermined frequency by a fiber optic conductor. Each of the bits have a state that is valid for a period. The receiver includes a plurality of optically-active devices arranged on an integrated circuit substrate in an array. The plurality of optically-active devices are capable of being positioned to receive the stream of optical data bits which are transmitted as light, and each of the optically active devices is capable of detecting light in an optically active state and generating a detected signal corresponding thereto. The receiver further includes a control circuit that receives a clock signal at a rate corresponding to the predetermined frequency and generates control signals which cause a different one of the plurality of optically-active devices to be in the optically active state during each successive period and thereby detect the presence of light during each of said successive periods and generate the detected signals corresponding to the data bit stream.

BRIEF DESCRIPTION OF THE DRAWINGS

FIG. 1 is a schematic block diagram of a receiver in accordance with a first embodiment of the present invention wherein the receiver is capable of detecting a stream of optical data bits which are transmitted from a fiber optic conductor and is coupled to a serial input processing circuit;

FIG. 2 illustrates a timing diagram for the receiver in FIG. 1;

FIG. 3 is a schematic block diagram of a receiver in accordance with a second embodiment of the invention wherein the receiver is capable of detecting a stream of optical data bits which are transmitted from a fiber optic conductor and is coupled to a parallel input processing circuit;

FIG. 4 illustrates a timing diagram for the receiver in FIG. 3;

FIG. 5 is a schematic block diagram of a receiver in accordance with a third embodiment of the invention wherein the receiver is coupled to multiple serial input processing circuits;

FIG. 6 is a schematic block diagram of a receiver in accordance with a fourth embodiment of the invention wherein the receiver is capable of detecting a low intensity optical data bit stream;

FIG. 6A illustrates a timing diagram for the receiver in FIG. 6;

FIG. 7 is a schematic block diagram of a receiver in accordance with a fifth embodiment of the invention wherein the receiver is capable of receiving optical data bit streams for a wider range of bandwidths;

FIG. 8 is a schematic block diagram of a system capable of transmitting and receiving optical data bit streams;

FIG. 9 illustrates an optically-active transmitting device which is positioned relative to an optically-active receiving device so that interference is prevented between the outgoing optical data bit stream and the incoming optical data bit stream;

FIG. 10 illustrates an optically-active transmitting device and optically-active receiving device positioned relative to a light blocking member so that interference is prevented between the outgoing optical data bit stream and the incoming optical data bit stream; and FIG. 11 is a schematic block diagram of a transmitter in accordance with an embodiment of the present invention.

DETAILED DESCRIPTION OF THE PREFERRED EMBODIMENTS

Those of ordinary skill in the art will realize that the following description of the preferred embodiments is illustrative only and not in any way limiting. Other embodiments of the invention will readily suggest themselves to those skilled in the art.

Referring in detail now to the drawings wherein similar parts or steps of the present invention are identified by like reference numerals, FIG. 1 illustrates a receiver 100 for detecting a stream of optical data bits which are transmitted through an optical fiber area 105 of a fiber optic conductor. The stream of optical data bits may originate from an appropriate source such as a fiber optic transmitter. An array 110 comprises a plurality of optically-active devices, such as devices A1–A3, B1–B3, and C1–C3, and is preferably arranged on a single integrated circuit substrate that is positioned relative to the optical fiber area 105 so that each of the optically-active devices receives a portion of an optical signal stream associated with a single bit of information. Each of the optically-active devices detects and outputs information relating to that bit stream.

FIG. 1 shows eight optically-active devices for purposes of explaining the functionality of the present invention. Based on the teachings of the present invention herein, however, it is understood that the array 110 can include other numbers of optically-active devices, typically a much greater number of such devices. For example, if a given array (comprising devices having a particular characteristic) require about 1,330 devices to properly process a 200 kilohertz bit stream signal, then if an array made of devices having the same characteristics were to process another signal with a bit rate of about 266 megahertz, that array would require over 1.7 million devices to properly detect each bit of the bit stream. As a further example, if the array 110 were to receive an optical data bit stream with a bit rate of about 25 megahertz, then at least about 11 GaAs-based optically-active devices would be required in order to properly detect each bit of the bit stream. More generally, however, the number of devices in the array will be constrained by the refresh rate of the devices, and the frequency of the optical signal. For an array that processes an incoming optical signal at a single frequency, the number of devices on the array must be equal to the frequency of the incoming signal divided by the refresh rate of each of the devices. For an array that processes incoming optical signals at various frequencies, the number of devices on the array must be equal to the sum of each frequency of each incoming signal divided by the refresh rate of each of the devices, which sum is multiplied by the number of various frequencies being input.

In one embodiment, the optically-active devices of array 110 are each implemented by an optically-active transistor. Each of the optically-active transistors may use a porous silicon (PSi) active area prepared by well known methods such as, for example, anodic etching. The optically-active transistors in array 110 may alternatively use an amorphous silicon active area. Integration is facilitated by using silicon-based optically-active devices in the array 110. As another alternative, the optically-active transistors may be based on gallium arsenide (GaAs). During operation, the optical data bit stream is received in the optical fiber area 105 and, when focused upon a gate of a given optically-active transistor, carriers are generated and swept into the drain of the given optically-active transistor.

The physical characteristics of the optically-active devices may vary due to size, doping, etc. Preferably, the physical characteristics of the optically-active devices in array 110 are similar so that all of the optically-active devices react to the control signals (from control circuit 120) and thereby permit alignment between the sampling time frames and the incoming bit stream. However, the array 110 may be varied so that the array 110 includes a first set of optically-active devices having a first characteristic type and a second set of optically-active devices having a second characteristic type. Thus, the first set of optically-active devices is capable of receiving a bit stream having a first clock rate and the second set of optically-active devices is capable of receiving another bit stream having a second clock rate.

The receiver 100 further includes the control circuit 120 and a processing circuit 125 coupled to the control circuit 120. Preferably, the control circuit 120 comprises a word line select, amplification and buffer circuit 130, a bit line select circuit 135, and a refresh circuit 136. The word line select amplification and buffer circuit 130 is coupled to the optically-active devices of array 110 via word lines 140 and array output lines 145. The bit line select circuit 135 is coupled to the optically-active devices of array 110 via bit lines 150. The refresh circuit 136 is coupled to the optically-active devices of array 110 via refresh lines 138.

The word line select portion of the word line select, amplification and buffer circuit 130 and the bit line select circuit 135 can be implemented by conventional decoder circuits similar to those used in memory systems for selectively addressing memory devices in a memory array. Specifically, for a given time (associated with one of successive periods) the word line select, amplification and buffer circuit 130 will address a specific word line 140, while the bit line select circuit 135 will address a particular bit line 150 so that a particular one of the optically-active devices in array 110 is selected in an optically active state. During an optically-active state, an optically-active device in array 110 can detect a portion of the optical signal stream, and depending upon the type of device used, either a current or a voltage can be detected. Alternatively, a single address can be used to select a single optically-active device, without requiring separate word and bit line address portions.

The word line select, amplification and buffer circuit 130 thereby receives the selected signal from the array 110, amplifies that signal using a conventional amplifier circuit, and has the capability of storing the signal in a buffer, such as a FIFO buffer, which then outputs the signal to the serial input processing circuitry in the order that they are received.

The processing circuit 125 can be implemented by a digital circuit capable of reconstructing an output signal (from the word line select, amplification and buffer circuit 130) in a desired pattern, as conventionally known.

The control circuit 120 receives the clock signal 170 at a rate which corresponds to the predetermined frequency (e.g., 266 megahertz) of the data bit stream which can be, for example, detected from the data bit stream in optical fiber area 105.

In response to the clock signal 170, the control circuit 120 generates control signals 180 (FIG. 2), thereby causing each of the plurality of optically-active devices (e.g., A1–A3, B1 and B3, and C1–C3) to be in an optically-active state during successive periods. The control signals 180 (FIG. 2) include both control signals transmitted via word lines 140 and bit lines 150. The optically-active devices of array 110 are capable of detecting light when in an optically-active state. Thus, each of the plurality of optically-active devices can detect the presence of light in the optical fiber area 105 when optically-active during successive periods. Each optically-active device in array 110 is turned on and off in sequence such that each optically-active device (when on) will detect a portion of the optical data bit stream corresponding to one bit of information. When a given optically-active device is in an optically-active state at a particular time, the given optically-active device is capable of detecting the bit value (i.e., high or low level) of the optical data bit stream at that particular time. The optically-active devices of array 110 will then generate the detected signals (via array output lines 145) for input into the word line select, amplification and buffer circuit 130. The detected signals correspond to the bit values of the detected optical data bit stream in optical fiber area 105.

After the signals are detected and transmitted to the word line select, amlification and buffer circuit 130, the refresh circuit 136 will cause the charge to be drained off of the optically active device to prepare it to receive another signal at a subsequent point in time.

The word line select, amplification and buffer circuit 130 outputs the detected signals as signals 190 (as shown in FIG. 2) as previously described. The signals 190 are serially driven into the processing circuit 125 so that all detected signals from the optical fiber area 105 are reformed into desired output patterns.

With continuing reference to FIGS. 1 and 2, discussion is now turned to operation of the receiver 100. An optical data bit stream is first transmitted as light via the fiber optic conductor, and the optical data bits are detected at the optical fiber area 105 by the plurality of silicon-based optically-active devices of array 110. All of the devices in the array 110 are equally exposed to the incoming optical data bit stream. However, each of the optically-active devices is selectively controlled to detect (at different time periods) a single bit of the incoming optical data bit stream. A given optically-active device in array 110 can detect a given bit of the incoming optical data bit stream when the given device is in an optically-active state. The control circuit 120 receives the clock signal 170 (FIG. 2) at a rate corresponding to the predetermined frequency of the incoming optical data bit stream. Since the clock signal 170 is synchronized with the bit rate of the incoming optical data bit stream, one of the optically-active devices is in an optically-active state for the duty cycle of the incoming optical data bit stream. Each one of the optically-active devices is selected to turn on at respective sampling time frames so that there is alignment between the sampling time frames and the bit stream. In other words, sampling occurs in the valid portions of the bits in the bit stream. If, however, the sampling time frames of the optically-active devices are not aligned with the valid portions of the bits in the bit stream, then additional processing circuitry can be added to the receiver 100 to compensate for errors resulting from the misalignment.

The receiver 100 in FIG. 1 is capable of serially processing detected signals 190 (FIG. 2) from the optical fiber area 105 to the processing circuit 125. With reference to Table 1, assume the following optically-active devices will be in an optically active state for corresponding predetermined time periods.

TABLE 1

| Device | Periods when device is in optically active state |
| --- | --- |
| A1 | t1 |
| A2 | t2 |
| A3 | t3 |
| B1 | t4 |
| B3 | t5 |
| C1 | t6 |
| C2 | t7 |

A given optically-active device in the array 110 will detect the presence of an incoming light when the given device is in an optically active state and generate a detected signal corresponding to the detected incoming light. By controlling different optically active devices in the array 110 to detect the incoming light stream by use of high speed electronic control circuit 120, devices having slower recovery times, which are still fast enough to see the incoming signal, can be used to selectively sample the incoming high frequency optical data bit stream.

In FIG. 2, the detected signals generated by the array 110 (in response to the incoming light stream in optical fiber area 105) are represented in the waveform 190. The waveform 190 is serially driven as an input signal into the processing circuit 125. The input signal of the processing circuit 125 is then reformed to have a desired pattern.

FIG. 3 shows a receiver 250 for allowing parallel processing of detected signals corresponding to the incoming optical data bit stream in the optical fiber area 105. The receiver 250 includes an output buffer 255 that receives in parallel the data bit stream for the word line select and amplification circuit 130A (which circuit does not include a buffer in this embodiment, instead using the buffer 255) which is coupled to the control circuit 120 and a parallel input processing circuit 260. The output buffer 255 can be implemented by a standard buffer circuit which is capable of receiving and buffering data bits which are transmitted as output from the array 110 via word line select and amplification circuit 130A. The clock signal 170 is also driven into the output buffer 255 to provide timing for the strobe-out function after the output buffer 255 is filled with data bits. The parallel input processing circuit 260 may be implemented by a digital circuit which can receive parallel input signals transmitted from the buffer 255. In the example shown in FIG. 3, the parallel input processing circuit 260 is capable of receiving at least one eight-bit parallel input signal from buffer 255.

Reference is now made to FIG. 4 which illustrates timing diagrams for the receiver 250 in FIG. 3. The waveform 280 represents the detected signals generated by the optically-active devices A1–A3, B1, B3, and C1–C3 wherein the detected signals correspond to the detected optical data bit stream. During t1, the detected signal from device A1 is stored in output buffer 255. Similarly, the detected signals from devices A2, A3, B1, B3, C1, C2, and C3 are stored in buffer 255 during t2, t3, t4, t5, t6, t7, and t8, respectively. When the detected signal from device C3 is driven into buffer 255 during t8, the detected signals are fully stored as data bits in the buffer 255 in preparation for a subsequent parallel output. At subsequent time t9, the output buffer 255 transmits the detected signals to the processing circuit 260 as an 8-bit data output as shown by waveform 285. Thus, prior to t9 no information is driven as input into the parallel input processing circuit 260 by output buffer 255, since the detected signals from the array 110 are transmitted into and filling up buffer 255. Subsequent to t9, detected signals are again transmitted by the optically-active devices in array 110 and stored in output buffer 255. After the output buffer 255 is filled with data bits, it will transmit another 8-bit data output to the processing circuit 260.

Based on the teachings of the present invention, it is understood that the parallel input processing circuit 260 receives additional sets of eight-bit parallel signals which are transmitted from other optically-active devices in array 110. For purposes of discussing the functionality of the present invention, FIG. 3 illustrates only one output buffer 255 and only one set of eight-bit parallel signals (as transmitted from optically-active devices A1–A3, B1 & B3, and C1–C3). Upon receiving the parallel input signals from the output buffer 255, the parallel input processing circuit 255 reconstructs the parallel input signals into a desired pattern, as conventionally known.

FIG. 5 shows a receiver 300 in accordance with another embodiment of the present invention. The receiver 300 includes a fan-out/amplification circuit 305 for providing the bit stream data to multiple processing circuits without signal degradation. The fan-out/amplification circuit 305 includes a plurality of output lines 310-1 . . . 310-n for transmitting detected signals from the array 110. Each of the output lines 310-1 . . . 310-n is coupled to a respective serial input processing circuit. For example, output line 310-1 is coupled to serial input processing circuit 125-1 for receiving and processing the serial data output signals from the fan-out/amplification circuit 305. The output line 310-n is coupled to the serial input processing circuit 125-n. It is understood that a controller is provided for determining which of the output lines 310-1 . . . 310-n is selected for transmitting a given serial data output signal from fan-out/amplification circuit 305. Based upon the teachings of the present invention, it is further understood that the receiver 300 includes additional serial input processing circuits which are capable of reforming detected signals (from optical fiber area 105) into desired output patterns, as conventionally known.

Based on the teachings of the present invention, it will be appreciated by those skilled in the art that fan-out/amplification circuits can be coupled to the control circuits of other receivers disclosed herein. The fan-out/amplification circuits can be used to drive multiple stages or arrays of processing circuits such as, for example, an array of MPUs.

FIG. 6 shows a receiver 350 capable of detecting low intensity optical signals from fiber optic area 105. In contrast to the embodiments previously described, in this embodiment multiple optically-active devices will be in an optically active state for any given period to ensure that the data bit stream is properly detected. An array 355 comprises a plurality of optically-active devices, including devices A11–A16 and B11–B16. Based on the teachings of the present invention herein, it is understood that the array 355 further includes additional optically-active devices.

The receiver 350 further includes a control circuit 360 and the processing circuit 125 coupled to the control circuit 360. Preferably, the control circuit 360 comprises word line select, amplification and buffer circuit 365 and a bit line select 367. The word line select, amplification and buffer circuit 365 is coupled to the optically-active devices A11–A16 via word lines 370a–370c and array output lines 375a–375c. The bit line select circuit 367 is coupled to the optically-active devices A11–A16 via bit line 380. The word line select circuit 360 is coupled to the optically-active devices B11–B16 via word lines 385a–385c and array output lines 390a–390c. The bit line select circuit 367 is coupled to the optically-active devices B11–B16 via bit line 395.

Reference is now made to the timing diagram of FIG. 6A for purposes of discussing the functionality of the receiver 350. In order to detect an incoming low intensity optical data bit stream, the devices A11 and A14, for example, will be in an optically-active state at time t1, as shown by the waveform 410. The devices A11 and A14 are switched into an optically-active state after being selected by control signals transmitted via word line 370a and bit line 380. The devices A11 and A14 will then receive a portion of the incoming low intensity optical data bit stream associated with a single bit of information. The devices A11 and A14 will then generate a detected signal (via array output line 375a) which corresponds to the detected data bit stream portion.

At time t2, devices A12 and A15 will be in an optically active state after being selected by control signals transmitted via word line 370b and bit line 380. Other devices in the array 355 will also be in an optically active state at subsequent respective time periods, as best illustrated in FIG. 6A. The optically-active device pairs (e.g., A11/A14, B11/B14) in array 255 are turned on and off in sequence such that each optically-active device pair (when on) will detect a portion of the low intensity optical data bit stream corresponding to one bit of information.

FIG. 7 shows a receiver 450 which is capable of receiving an optical data bit stream having a wide fiber frequency bandwidth range. An array 455 comprises a plurality of optically-active devices, including devices A21–A26 and B21–B26. The receiver 450 further includes a control circuit 460 and processing circuits 465 and 470 coupled to the control circuit 460. The control circuit 460 comprises word line select circuit 475, bit line select circuit 480 and refresh circuit 482, each of which are capable of receiving a first clock signal 530, as well as word line select circuit 485, bit line select circuit 490, and refresh circuit 492, each of which are capable of receiving a second clock signal 535.

The word line select circuit 475 is coupled to the optically-active devices A21–A26 via word lines 500a–500c and array output lines 505a–505c. The bit line select circuit 480 is coupled to the optically-active devices A21–A26 via bit line 510. The refresh circuit 482 is coupled to the optically-active devices A21–A26 via refresh lines 5484. The word line select circuit 485 is coupled to the optically-active devices B21–B26 via word lines 515a–515c and array output lines 520a–520c. The bit line select circuit 490 is coupled to the optically-active devices B21–B26 via bit line 525. The refresh circuit 492 is coupled to the optically-active devices B21–B26 via refresh lines 494.

For synchronous designs, the array of optically active devices can be divided to accommodate multiple input data streams. This requires that input data is first sent which contains the total number of data streams and frequency of each. Based on this input data, the control circuit 460 divide the array of optically active devices into arrays, one for each data stream, to simultaneously process the incoming data across all frequencies. The control circuitry 460 assigns clock rates to each part of the array so as to be able to detect the incoming data. This data can be stored in a buffer for serial or parallel processing as described previously. This implementation also requires that a start and stop signal be transmitted with the data.

Thus, for a synchronous design having two streams, the control circuit 460 receives the clock signal 530 at a rate corresponding to a first predetermined frequency value and causes the optically-active devices A21–A26 to be in an optically active state. When the optically-active devices A21–A26 are optically active, they are capable of detecting bits of the incoming data bit stream at the first pre-determined frequency. The control circuit 460 also receives the clock signal 535 at a rate corresponding to a second predetermined frequency value and causes the optically-active devices B21–B26 to be in an optically active state. When the optically-active devices B21–B26 are optically active, they are capable of detecting bits of the incoming data bit stream at the second pre-determined frequency. Thus, the receiver 450 is particularly advantageous when detecting an incoming optical data bit stream with a wide bandwidth range.

For asynchronous designs, only a single frequency can be used. Also, separate arrays can be used, for example, to detect even and odd bits, such that one array detects only even bits and the other array detects odd bits.

FIG. 8 shows a receiver/transmitter system 600 for processing optical data bit streams. An array 605 comprises a plurality of optically-active devices, including receiving devices A31–A33, B31, B33, and C31–C33, and transmitting devices A31'–A33', B31', B33', and C31'–C33'. The transmitting devices may be implemented by light emitting diodes (LEDs) which are, for example, silicon based. To transmit an optical data bit stream with an output fiber bit rate of about one (1) megahertz, at least about 266 silicon-based LEDs are required if such LED's are fabricated using conventional transistors. To transmit an optical data bit stream with an output fiber bit rate of about 25 megahertz, at least about 11 GaAs-based LEDs are required.

The receiver/transmitter system 600 comprises a control circuit 607 including a word line select circuit 610, bit line select 615, and refresh circuit 618. The control circuit 607 is coupled to the receiving devices A31–A33, B31, B33, and C31–C33. The control circuit 607 is further coupled via output line 620 to a subsequent circuit such as a serial processing circuit as previously described herein. The clock signal 625 is received by the control circuit 607 and is synchronized with the fiber bit rate of the incoming data bit stream in the optical fiber area 105. When processing an incoming data bit stream, the receiving devices in array 605 and the control circuit 607 function in the same manner as previously described above.

An output control circuit 630 comprises bit line select circuit 635 and word line select circuit 640, and is coupled to the transmitting devices A31'–A33', B31', B33', and C31'–C33'. The output control circuit 630 receives a clock signal 645 which is synchronized with the fiber bit rate of the optical data bit stream which is emitted by the transmitting devices in array 605. When the receiver/transmitter system 600 is transmitting information, at least one of the transmitting devices in array 105 is on for the duty cycle of the outgoing information. The output control circuit 630 receives (via input line 650) transmission data from an appropriate output circuit.

Referring now to FIG. 9, the transmitting device A31' and receiving device A31 are shown for purposes of discussing the prevention of optical interference in the receiver/transmitter system 600. The transmitting device A31' is capable of transmitting light to the optical fiber area 105 via area (output cone) 700, while the receiving device A31 is capable of receiving light via area (input cone) 705. The transmitting device A31' has a central portion 710, while the receiving device A31 has a central portion 715. To prevent optical interference during data transmission of transmitting device A31' and data reception of receiving device A31, the central portions 710 and 715 are separated by a distance D such that the output cone of each transmitting device does not overlap with the input cone of each optically-active receiving device when the optical fiber area 106 is positioned a distance T from each transmitting device.

The cone angle C is adjusted by using micro-lenses or by adjusting the active area of the devices. Examples of typical values for D, T and C are listed below:

D=about 0.1 micron to about 100 microns
T=about 0.1 micron to about 1.0 millimeter
C=about 10 degrees to about 80 degrees.

As best illustrated in FIG. 10, optical interference between transmitting device A31' and receiving device A31 can also be prevented by positioning a light blocking material 750 relative to the devices A31' and A31. The light blocking material prevents cross talk between an outgoing data bit stream which is being transmitted via output cone 700 and an incoming data bit stream which is being received via input cone 705. The light blocking material may be a suitable material capable or absorbing the incoming or outgoing light stream such as aluminum.

Referring now to FIG. 11, a transmitter 800 is shown in accordance with the present invention. The transmitter 800 may be implemented by the transmitting devices A31'–A33', B31', B33', and C31'–C33' and the output control circuit 630 coupled to the transmitting devices, as previously discussed with reference to FIG. 8. When processing the outgoing data bit stream, the transmitting devices and the output control circuit 630 function in the same manner as previously described above.

Thus, while the present invention has been described herein with reference to particular embodiments thereof, a latitude of modification, various changes and substitution are intended in the foregoing disclosure, and it will be appreciated that in some instances some features of the invention will be employed without a corresponding use of other features without departing from the scope of the invention as set forth.

What is claimed is:

1. A receiver for detecting a stream of optical data bits being transmitted as light at a predetermined frequency by a fiber optic conductor, each of said bits having a state that is valid for a period, comprising:
   a plurality of optically-active devices arranged on an integrated circuit substrate in an array, said plurality of optically-active devices capable of being positioned to receive said stream of optical data bits transmitted as light, and each of said optically-active devices capable of detecting light in an optically active state and generating a detected signal corresponding thereto; and
   a control circuit that receives a clock signal at a rate corresponding to said predetermined frequency and generates control signals which cause a different one of said plurality of optically-active devices to be in said optically active state during each successive period and thereby detect the presence of light during each successive period and generate said detected signals corresponding to the stream of optical data bits.

2. A receiver according to claim 1 further including a processing circuit coupled to the control circuit, the processing circuit capable of reforming said detected signals to have a desired output pattern.

3. A receiver according to claim 1 wherein the optically-active devices each comprises an optically-active transistor.

4. A receiver according to claim 3 wherein the optically-active transistor is a silicon-based transistor.

5. A receiver according to claim 1 further comprising:
   a plurality of word lines;
   a plurality of bit lines;
      wherein the control circuit comprises a word line select circuit that generates a word line control signal that causes the selection of a different one of said plurality of word lines so that the word line select circuit thereby causes the selection of optically-active devices coupled to the selected word line during each successive period; and
      wherein the control circuit further comprises a bit line select circuit that generates a bit line control signal that causes the selection of one of said plurality of bit lines so that the bit line select circuit thereby causes the selection of said different one of the plurality of optically-active devices coupled to the selected word line during each successive period.

6. A receiver according to claim 2 wherein the processing circuit is capable of receiving the detected signals as serial inputs.

7. A receiver according to claim 1 further comprising:
   an output buffer coupled to the control circuit and to the processing circuit, for buffering the detected signals and transmitting the detected signals as parallel output signals.

8. A receiver according to claim 1 further comprising:
a plurality of processing circuits each capable of reforming the detected signals to have a desired output pattern; and
a fan-out/amplification circuit coupled to the control circuit, for transmitting the detected signals to each of the plurality of processing circuits.

9. A receiver according to claim 1 wherein:
the control circuit generates the control signals to cause multiple optically-active devices to be in the optically active state during each successive period and thereby detect the presence of light during each successive period and generate the detected signals corresponding to the stream of optical data bits.

10. A receiver according to claim 9 wherein:
each of the multiple optically-active devices in the optically active state during a particular one of the successive periods is controlled by a particular one of the control signals from the control circuit.

11. A receiver according to claim 10 further comprising:
a plurality of word lines;
a plurality of bit lines;
wherein the control circuit comprises a word line select circuit that generates a word line control signal that causes the selection of one of said plurality of word lines so that the word line select circuit thereby causes the selection of optically-active devices coupled to the selected word line during each successive period; and
wherein the control circuit further comprises a bit line select circuit that generates a bit line control signal that causes the selection of a plurality of bit lines so that the bit line select circuit thereby causes the selection of said multiple optically-active devices coupled to the selected word line during each successive period.

12. A receiver according to claim 1 wherein:
the plurality of optically-active devices is arranged on the integrated circuit substrate in a first group and a second group,
the control circuit receives the first clock signal and generates the control signals which cause a different one of the optically-active devices in the first group to be in the optically active state during each successive period,
the control circuit further receives a second clock signal and generates additional control signals which cause a different one of the optically-active devices in the second group to be in the optically active state during each successive period so that during each successive period an optically-active device in the first group and an optically-active device in the second group are both in the optically-active state and thereby capable of detecting the stream of optical data bits.

13. A receiver according to claim 12 wherein the control circuit comprises:
a first plurality of word lines coupled to the first group in the plurality of optically-active devices;
a second plurality of word lines coupled to the second group in the plurality of optically-active devices;
a first plurality of bit lines coupled to the first group in the plurality of optically-active devices;
a second plurality of bit lines coupled to the second group in the plurality of optically-active devices;
wherein the control circuit comprises a first word line select circuit that generates a first set of word line control signals for causing the selection of a different one of said first plurality of word lines so that during each successive period the first word line select circuit thereby causes the selection of optically-active devices coupled to the selected word line in the first plurality of word lines;
wherein the control circuit further comprises a first bit line select circuit that generates a first set of bit line control signals for causing the selection of one of said first plurality of bit lines so that during each successive period the first bit line select circuit thereby causes the selection of said different one of the optically-active devices coupled to the selected word line in the first plurality of word lines;
wherein the control circuit further comprises a second word line select circuit that generates a second set of word line control signals for causing the selection of a different one of said second plurality of word lines so that during each successive period the second word line select circuit thereby causes the selection of optically-active devices coupled to the selected word line in the second plurality of word lines; and
wherein the control circuit further comprises a second bit line select circuit that generates a second set of bit line control signals for causing the selection of one of said second plurality of bit lines so that during each successive period the second bit line select circuit thereby causes the selection of said different one of the optically-active devices coupled to the selected word line in the second plurality of word lines.

14. A receiver according to claim 12 further comprising:
a first processing circuit coupled to the control circuit, the first processing circuit capable of reforming the detected signals to have a desired output pattern.

15. A receiver according to claim 14 further comprising:
a second processing circuit coupled to the control circuit.

16. A transmitter for transmitting an output stream of optical data bits as light through a fiber optic conductor, the output stream having a predetermined frequency, each of the bits having a state that is valid for a period, the transmitter comprising:
a plurality of light-emitting devices arranged on an integrated circuit substrate in an array, each of the plurality of light-emitting devices capable of transmitting light in an optically active state; and
an output control circuit that receives a transmit clock signal at a rate corresponding to the predetermined frequency of the output stream, the output control circuit transmits output control signals which cause a different one of the plurality of light-emitting devices to be in the optically active state during each successive period and thereby transmit light during each successive period.

17. A transmitter according to claim 16 further comprising:
a plurality of word lines;
a plurality of bit lines;
wherein the output control circuit comprises a word line select circuit that generates a word line control signal that causes the selection of a different one of said plurality of word lines so that during each successive period the word line select circuit thereby causes the selection of light-emitting devices coupled to the selected word line; and
wherein the output control circuit further comprises a bit line select circuit that generates a bit line control signal that causes the selection of one of said plurality of bit lines so that the bit line select circuit thereby causes the selection of said different one of the plurality of light-emitting devices coupled to the selected word line during each successive period.

18. A transmitter according to claim 16 wherein a particular one of the plurality of light-emitting devices is separated by a predetermined distance from a particular one of a plurality of light-emitting devices for detecting an optical data bit stream so that optical interference is prevented between the particular light-emitting device and the particular optically-active device.

19. A transmitter according to claim 16 further comprising:
a light blocking member positioned relative to a particular one of the light-emitting devices and a particular one of a plurality of optically-active devices for detecting an optical data bit stream so that optical interference is prevented between the particular light-emitting device and the particular optically-active device.

20. A receiver for processing an optical data bit stream being transmitted as light at a predetermined frequency by a fiber optic conductor, comprising:
a plurality of optically-active devices arranged on an integrated circuit substrate in an array, each of the plurality of optically-active devices capable of switching in sequence into and from an optically active state and thereby detect a portion of the optical data bit stream corresponding to one bit of information and generate a detected signal corresponding to the detected portion of the optical data bit stream; and
a control circuit that generates control signals for switching in sequence a different one of the plurality of optically-active devices into and from an optically active state during a respective one of successive periods.

21. A receiver according to claim 20 further including a processing circuit coupled to the control circuit, the processing circuit capable of reforming said detected signals to have a desired output pattern.

22. A receiver according to claim 20 wherein the optically-active devices each comprises an optically-active transistor.

23. A receiver according to claim 22 wherein the optically-active transistor is a silicon-based transistor.

24. A receiver according to claim 20 wherein the control circuit comprises:
a plurality of word lines;
a plurality of bit lines;
wherein the control circuit comprises a word line select circuit that generates a word line control signal that causes the selection of a different one of said plurality of word lines so that during each successive period the word line select circuit thereby causes the selection of optically-active devices coupled to the selected word line during each successive period; and
wherein the control circuit further comprises a bit line select circuit that generates a bit line control signal that causes the selection of one of said plurality of bit lines so that the bit line select circuit thereby causes the selection of said different one of the plurality of optically-active devices coupled to the selected word line during each successive period.

25. A receiver according to claim 20 wherein the processing circuit is capable of receiving the detected signals as serial inputs.

26. A receiver according to claim 20 further comprising:
an output buffer coupled to the control circuit and to the processing circuit, for buffering the detected signals and transmitting the detected signals as parallel output signals.

27. A receiver according to claim 20 further comprising:
a plurality of processing circuits each capable of reforming the detected signals to have a desired output pattern; and
a fan-out/amplification circuit coupled to the control circuit, for transmitting the detected signals to each of the plurality of processing circuits.

28. A receiver according to claim 20 wherein:
the control circuit generates the control signals to cause multiple optically-active devices to be in the optically active state during each successive period and thereby detect the presence of light during each successive period and generate the detected signals corresponding to the stream of optical data bits.

29. A receiver according to claim 28 further comprising:
the control circuit generates a particular one of the control signals to cause each of the multiple optically-active devices to be in the optically active state in a particular one of the successive periods.

30. The receiver of claim 29 wherein the control circuit comprises:
a plurality of word lines;
a plurality of bit lines;
wherein the control circuit comprises a word line select circuit that generates a word line control signal that causes the selection of one of said plurality of word lines so that during each successive period the word line select circuit thereby causes the selection of optically-active devices coupled to the selected word line; and
wherein the control circuit further comprises a bit line select circuit that generates a bit line control signal that causes the selection of a plurality of bit lines so that the bit line select circuit thereby causes the selection of said multiple optically-active devices coupled to the selected word line during each successive period.

31. A receiver according to claim 20 wherein:
the plurality of optically-active devices is arranged on the integrated circuit substrate in a first group and a second group, the control circuit receives a first clock signal and generates the control signals which cause a different one of the optically-active devices in the first group to be in the optically active state during each successive period, the control circuit further receives a second clock signal and generates additional control signals which cause a different one of the optically-active devices in the second group to be in the optically active state during each successive period so that during each successive period an optically-active device in the first group and an optically-active device in the second group are both in the optically-active state and thereby capable of detecting the stream of optical data bits.

32. A receiver according to claim 31 wherein the control circuit comprises:
a first plurality of word lines coupled to the first group in the plurality of optically-active devices;
a second plurality of word lines coupled to the second group in the plurality of optically-active devices;
a first plurality of bit lines coupled to the first group in the plurality of optically-active devices;

a second plurality of bit lines coupled to the second group in the plurality of optically-active devices;

wherein the control circuit comprises a first word line select circuit that generates a first set of word line control signals for causing the selection of a different one of said first plurality of word lines so that during each successive period the first word line select circuit thereby causes the selection of optically-active devices coupled to the selected word line in the first plurality of word lines;

wherein the control circuit further comprises a first bit line select circuit that generates a first set of bit line control signals for causing the selection of one of said first plurality of bit lines so that during each successive period the first bit line select circuit thereby causes the selection of said different one of the optically-active devices coupled to the selected word line in the first plurality of word lines;

wherein the control circuit further comprises a second word line select circuit that generates a second set of word line control signals for causing the selection of a different one of said second plurality of word lines so that during each successive period the second word line select circuit thereby causes the selection of optically-active devices coupled to the selected word line in the second plurality of word lines; and wherein the control circuit further comprises a second bit line select circuit that generates a second set of bit line control signals for causing the selection of one of said second plurality of bit lines so that during each successive period the second bit line select circuit thereby causes the selection of said different one of the optically-active devices coupled to the selected word line in the second plurality of word lines.

33. The receiver of claim 31 further comprising:

a first processing circuit coupled to the control circuit, the first processing circuit capable of reforming the detected signals to have a desired output pattern.

34. The receiver of claim 33 further comprising:

a second processing circuit coupled to the control circuit, the second processing circuit capable of reforming the detected signals to have a desired output pattern.

35. A method of detecting a stream of optical data bits being transmitted as light at a predetermined frequency by a fiber optic conductor having an optical fiber area, the method comprising the steps of:

receiving the stream of optical data bits in the optical fiber area;

providing a plurality of optically-active devices arranged in a first group and a second group, the first group capable of detecting a first bit stream, the second group capable of detecting a second bit stream, the first bit steam and the second bit stream superimposed upon each other to form the stream of optical data bits being transmitted as light;

operating a different one of said optically-active devices in said first group in the optically active state during each successive period in order to detect the first bit stream during each successive period; and operating a different one of said optically-active devices in said second group in the optically active state during each successive period in order to detect the second bit stream during each successive period so that a combination of said different one of said optically-active devices in said fist group and said different one of said optically-active devices in said second group detect the stream of optical bits being transmitted as light during each successive period and generate the detected signals corresponding to the stream of optical data bits.

36. A method of detecting an optical data bit stream being transmitted as light by a fiber optic conductor having an optical fiber area, the optical data bit stream having a predetermined frequency, the method comprising the steps of:

receiving the optical data bit stream in the optical fiber area;

detecting the optical data bit stream during each successive period by use of a plurality of optically-active devices controlled based on a clock signal which is synchronized with said predetermined frequency so that a different one of said plurality of optically-active devices is in an optically active state during each successive period and thereby detects the presence of light during each successive period; and generating detected signals corresponding to the detected optical bit stream.

37. A method according to claim 36 further comprising:

reforming the detected signals into desired output patterns.

38. A method according to claim 36 wherein during said detecting step:

multiple optically-active devices in said plurality of optically-active devices are in the optically active state during each successive period to detect the optical data bit.

39. A method according to claim 36 wherein said plurality of optically-active devices is arranged in a first group and a second group; and wherein said detecting step comprises the steps of:

operating a different one of said optically-active devices in said first group in the optically active state during each successive period, the first group controlled based on the clock signal which is synchronized with said predetermined frequency, and operating a different one of said optically-active devices in said second group in the optically active state during each successive period, the second group controlled based on a second clock signal which is synchronized at a frequency different from said predetermined frequency, so that a different one of said optically-active devices in said first group and a different one of said optically-active devices in said second group detect in combination all incoming bits of said optical data bit stream during each successive period.

40. An apparatus for transmitting an output stream of optical data bits and for receiving an incoming stream of optical data bits, the incoming stream being transmitted as light at a predetermined incoming frequency, the outgoing stream being transmitted as light at a predetermined output frequency, the apparatus comprising:

a plurality of optically-active devices arranged on an integrated circuit substrate in an array, said plurality of optically-active devices capable of being positioned to receive said incoming stream, and each of said optically-active devices capable of detecting light in an optically active state and generating a detected signal corresponding thereto;

an input control circuit that receives an input clock signal at a rate corresponding to said predetermined input frequency and generates input control signals which cause a different one of said plurality of optically-active devices to be in said optically active state during each successive period and thereby detect the presence of light during each successive period and generate said detected signals corresponding to the input stream of optical data bits;

a plurality of light-emitting devices arranged relative to the plurality of optically-active devices, the plurality of light-emitting devices arranged on the integrated circuit substrate in an array, each of the plurality of light-emitting devices capable of transmitting light in an optically active state; and an output control circuit that receives a transmit clock signal at a rate corresponding to the predetermined output frequency of the output stream, the output control circuit transmits output control signals which cause a different one of the plurality of light-emitting devices to switch in sequence into and from the optically active state and thereby transmit light when the different one of the plurality of light-emitting devices is in the optically active state.

41. The apparatus of claim 40 wherein a different one of the plurality of light-emitting devices is capable of transmitting light and a different one of the plurality of optically-active devices is capable of detecting light during each successive period.

42. The apparatus of claim 40 wherein a particular one of the plurality of light-emitting devices is separated by a predetermined distance from a particular one of the plurality of light-emitting devices so that optical interference is prevented between the particular light-emitting device and the particular optically-active device.

43. The apparatus of claim 40 further comprising:

a light blocking member positioned relative to a particular one of the light-emitting devices and a particular one of the plurality of optically-active devices so that optical interference is prevented between the particular light-emitting device and the particular optically-active device.

* * * * *